United States Patent [19]
Iijima

[11] Patent Number: 6,148,536
[45] Date of Patent: Nov. 21, 2000

[54] TWO-FLUID NOZZLE AND DEVICE EMPLOYING THE SAME NOZZLE FOR FREEZING AND DRYING LIQUID CONTAINING BIOLOGICAL SUBSTANCES

[75] Inventor: Tetsuo Iijima, Tokyo, Japan

[73] Assignee: Nippon Telegraph and Telephone Corporation, Japan

[21] Appl. No.: 09/202,198

[22] PCT Filed: Dec. 27, 1996

[86] PCT No.: PCT/JP96/03854

§ 371 Date: Dec. 8, 1998

§ 102(e) Date: Dec. 8, 1998

[87] PCT Pub. No.: WO97/47392

PCT Pub. Date: Dec. 18, 1997

[30] Foreign Application Priority Data

Jun. 10, 1996 [JP] Japan .................................. 8-147671

[51] Int. Cl.[7] .................................................. F26B 13/30
[52] U.S. Cl. ........................ 34/92; 34/284; 239/404; 239/406
[58] Field of Search ........................ 34/92, 284–293; 239/404, 406, 425.5

[56] References Cited

U.S. PATENT DOCUMENTS

| 1,474,603 | 11/1923 | Morse | 239/404 |
|---|---|---|---|
| 3,172,735 | 3/1965 | Barclay et al. | 239/406 |
| 3,717,306 | 2/1973 | Hushon et al. | 239/404 |
| 3,844,484 | 10/1974 | Masai | 239/404 |
| 4,335,677 | 6/1982 | Nagata et al. | 239/406 |

FOREIGN PATENT DOCUMENTS

| 0 432 232 B1 | 5/1994 | European Pat. Off. . |
|---|---|---|
| 52-5366 | 9/1974 | Japan . |
| 7-39339 B2 | 1/1992 | Japan . |
| 8-200623 | 8/1996 | Japan . |
| WO 90/13285 A1 | 11/1990 | WIPO . |

Primary Examiner—James C. Yeung
Attorney, Agent, or Firm—Pennie & Edmonds LLP

[57] ABSTRACT

A two-fluid nozzle for atomizing a liquid by mixing the liquid and a gas at high speed, wherein desired particle size is obtained at a low pressure, and a device employing the same nozzle for freezing and drying a liquid containing a biological substance are disclosed. The two-fluid nozzle which is provided with a first injection hole for injecting the liquid and a second injection hole for injecting the gas, wherein the second injection hole is provided around the outer periphery of the first injection hole; a revolving means (108 or 118) is provided to at least the front portion of the first injection hole for rending the liquid into revolving flow; and a revolving means (117) is provided to at least the front portion of the second injection holes for rending the gas into revolving flow, is suitable for atomization of a liquid containing a biological substance because the atomization at a low pressure is possible through operation of the revolving means for rending the gas and liquid into revolving flows.

24 Claims, 12 Drawing Sheets

TWO-FLUID NOZZLE AND DEVICE EMPLOYING THE SAME NOZZLE FOR FREEZING AND DRYING LIQUID CONTAINING BIOLOGICAL SUBSTANCES

TECHNICAL FIELD

The present invention relates to a two-fluid nozzle employed in the atomization of a liquid, and to a freeze-dryer for a liquid containing a biological substance which employs this two-fluid nozzle. More specifically, the present invention relates to a two-fluid nozzle suitably employed in the atomization of a liquid containing a biological substance which enables particles of the desired size to be obtained at low pressure, and to a freeze-dryer for a liquid containing a biological substance which employs the aforementioned two-fluid nozzle.

BACKGROUND ART

Other atomization methods which are conventionally known include 1) single fluid hydraulic spray nozzles and 2) two-fluid injection nozzles. Single fluid hydraulic spray nozzles pressurize a liquid without using gas, so that the liquid is sprayed out through small-diameter injection openings after passing through a revolving (spiral) passageway. Two-fluid injection nozzles atomize a liquid at the injection openings by using a high-speed gas to blow about and break up the liquid.

In both cases, however, the diameter of the sprayed particles is about 0.1 mm, with neither method being applicable when a smaller particle spray is desired. Moreover, in the case of the former nozzle, shearing stress on the high-pressure liquid results inside the nozzle, while the latter nozzle involves a process in which the liquid is broken up a number of times using the high speed gas. Accordingly, when the liquid contains vital cells, or pressure-sensitive components or structures, neither of the above-described methods can be used due to the considerable damage they cause.

In recent years, 3) ultrasonic wave nozzles have been developed. However, since the travel distance of the spray depends solely on the momentum of the particle, not only is the travel distance small, but, in principle, only one particle at a time can be generated from the ultrasonic wave nozzle injection openings. Thus, only very small samples can be processed, so that this type of nozzle cannot be used in mass production. Moreover, in order to increase the travel distance, a separate air blowing means is needed, leading to a disadvantageous increase in the scale of the device.

Japanese Patent Application, First Publication No. Hei 4-21551 discloses a two-fluid nozzle capable of granulation on the order of tens of microns, the nozzle provided with a liquid injection opening; a ring-shaped vortex flow chamber formed at a position so that it surrounds the liquid injection opening; a plurality of revolving guide holes which extend in the form of a spiral to the vortex flow chamber and direct a high speed gas flow into the vortex flow chamber where a high speed revolving flow is generated; and a ring-shaped gas injection opening which sprays and forms a tapered conical high speed vortex flow which has a focal point in front of the liquid injection opening of the vortex flow chamber. However, this two-fluid nozzle for rendering gas into a high speed revolving flow also causes pressure damage when the liquid contains structures or components, such as vital cells, which are sensitive to pressure. Accordingly, nozzle of this type has a limited field of use.

Conventional examples of devices for freeze-drying a liquid containing a biological substance include a device which atomizes and then freeze-dries blood by using a gas to drip the liquid into liquid nitrogen. Such a method is disclosed in Research in Frozen Preservation of Erythrocytes by Droplet Freezing, Tomoyoshi Sato, Journal of the Hokkaido University School of Medicine, Vol. 58, No. 2, pages 144–153 (1983).

This device is formed of a duplex tube consisting of a polyethylene inner tube having an inner diameter of 0.4 mm and an outer tube which surrounds the inner tube and has an inner diameter of 3 mm. Blood is introduced via the inner tube and gas is introduced via the outer tube. A negative pressure is generated at the output end of the inner tube due to Bernoulli's principle, causing the blood to be introduced into the output end of the inner tube. The blood then drips from the inner tube into liquid nitrogen which has been positioned below. The particle size of the dripped blood is determined by the diameter of the inner tube, while the dripping speed is determined by the volume of the gas flowing through the outer tube.

However, conventional devices which atomize and freeze blood are simple negative pressure arrangements employing Bernoulli's principle. As a result, there is not sufficient control over the atomization. Moreover, the particle size is a large 0.7–2.8 mm, with the devices unable to form particles of 0.5 mm or less. It is difficult to maintain control when the particle size is 0.5 mm, so that the survival rate of erythrocytes and other blood cells is extremely poor (i.e., there is a high rate of hemolysis). Moreover, in order to dry the frozen blood, it is necessary to move the blood to a separate dryer. Accordingly, not only is the arrangement troublesome, but it becomes difficult to maintain the sterility of the frozen blood when moving it from the freezing to the drying device.

DISCLOSURE OF INVENTION

The present invention provides a two-fluid nozzle capable of a wide range of atomization in accordance with the properties of the liquid and the particle limits, this nozzle permitting particles of the desired size to be obtained at a low pressure which may be suitably used for liquids that contain vital cells. The present invention further provides a freeze-dryer for a liquid containing a biological substance which employs the aforementioned nozzle and is capable of continuous freeze-drying.

The two-fluid nozzle of the present invention atomizes a liquid by mixing the liquid and a gas at high speed, the two-fluid nozzle having a first injection hole for injecting the liquid, and a second injection hole for injecting the gas. The second injection hole is provided around the outer periphery of the first injection hole, and a revolving means which renders the gas and liquid into revolving flows is provided to at least the front part of the first and second injection holes.

A revolving means is also provided to the liquid injecting hole in the two-fluid nozzle of the present invention, so that the liquid can be rendered into a revolving flow and then sprayed. As a result, smaller sized particles can be obtained at the same gas pressure and liquid flow volume conditions employed conventionally. At the same time, atomization employing a lower gas pressure and smaller liquid volume can be realized to achieve particles of the same size as obtained conventionally. Thus, the conditions for performing atomization using the two-fluid nozzle of the present invention are broad. As a result, even if the liquid to be atomized contains structures or components, such as vital cells, which are sensitive to pressure, the two-fluid nozzle of the present invention can carry out atomization under mild conditions.

A freeze-dryer for a liquid containing a biological substance of the present invention is provided with a biological-substance-containing liquid supply means for supplying a liquid containing a biological substance; a two-fluid nozzle for mixing and spraying a carrier gas and the liquid containing the biological substance supplied from the biological-substance-containing liquid supply means; a freeze-drying means for freezing the liquid containing the biological substance that was sprayed from the two-fluid nozzle; a nozzle internal cleaning means for cleaning off any of the liquid containing the biological substance which has become affixed to the inside of the two-fluid nozzle by flushing gas or a cleaning liquid through the two-fluid nozzle; a container for storing and preserving the frozen liquid containing the biological substance; and a drying means which sublimates the moisture inside the container. This two-fluid nozzle atomizes a liquid by mixing the liquid and a gas at high speed, the two-fluid nozzle having a first injection hole for spraying the liquid, and a second injection hole for spraying a gas. The second injection hole is provided about the outer periphery of the first injection hole. A revolving means is also provided to at least the front portion of first and second injection hole for rendering the gas and the liquid into a revolving flow.

The present invention's freeze-dryer for a liquid containing a biological substance enables a liquid containing a biological substance to be continuously and consistently freeze-dried while maintaining the sterility of the freeze-dried liquid containing the biological substance. At the same time, as a result of a two-fluid nozzle having the above-described structure, atomization can be carried out under conditions which suit the diameter and properties of the desired biological substance. Thus, it is possible to prevent breakage or a reduction in activity of the biological substance during freeze-drying.

In addition, by providing a heating member to the two-fluid nozzle, it is possible to prevent icing of the two-fluid nozzle. Thus, it becomes easy to perform continuous freeze-drying of a liquid containing a biological substance. By providing a nozzle internal cleaning means for cleaning the inside of the two-fluid nozzle and the supply tube for the liquid containing the biological substance, and a nozzle surface cleaning means for cleaning the nozzle surface, it is possible to prevent clogging of the nozzle or tubes. Thus, continuous freeze-drying of a liquid containing a biological substance becomes an easy matter.

The freeze-drying container for the liquid containing the biological substance also serves as a storage container after drying, thus providing a convenient and sterile design.

By employing a drying means provided with a means for heating the container, it is possible to carry out the sublimating process with high efficiency.

The present invention's freeze-dryer for a liquid containing a biological substance is provided with a heating heater for heating the two-fluid nozzle; a heating sensor for detecting the temperature of the two-fluid nozzle; and a temperature controller for controlling the temperature of the two-fluid nozzle to be within a fixed temperature range. As a result, the two-fluid nozzle can be maintained in the stable temperature range of 0–40° C., and preferably 20–37° C. Thus, it becomes an easy matter to provide a design employing continuous or intermittent spraying. By forming a nozzle assembly in which the two-fluid nozzle, heating heater, and temperature sensor are housed in the same housing, the attachment and release of the two-fluid nozzle, heating heater, and temperature sensor to and from the container can be carried out simply and quickly. Also, freeze-drying of a liquid containing a biological substance can be carried out continuously and efficiently.

By providing an exhaust gas means to the nozzle assembly for exhausting the carrier gas sprayed inside the container to the outside of the container, it becomes possible to spray the liquid within a small sealed container.

A nozzle attaching and releasing means is provided which moves one or both of the nozzle assembly and the container in at least an up and down, left and right, or rotational direction, in order to insert the nozzle assembly into or remove the nozzle assembly from the container. As a result, freeze-drying of a liquid containing a biological substance into a plurality of containers can be carried out efficiently.

By designing the drying means so that it vacuum dries the inside of the container from which the nozzle assembly has been withdrawn, continuous freezing and drying can be carried out for a plurality of containers. Thus, the freeze-drying of a liquid containing a biological substance into a plurality of containers can be performed efficiently. Moreover, by providing a container temperature controlling means for controlling the temperature of the container during vacuum drying, and in particular, by providing a container temperature controlling means which is provided with at least a heating heater or a cooling means, it is possible to increase the efficiency of sublimation.

BEST MODE FOR CARRYING OUT THE INVENTION

The two-fluid nozzle of the present invention is characterized in the provision of a revolving means to not only the gas injection hole, but also to the liquid injection hole from which the liquid to be atomized is injected.

The revolving means provided to the liquid injection hole is preferably in the form of a spiral groove or spiral fin. Specifically, a spiral groove or spiral fin may be provided to the inner wall of at least the front portion of the liquid injection hole, with a cylindrical member in which a spiral groove or spiral fin is formed in the inner wall engaging with at least the front portion of the liquid injection hole.

With respect to the revolving means for the gas injection hole, it is preferable to employ a revolving means such as disclosed in Japanese Patent Application, First Publication No. Hei 4-21551, i.e., a revolving means wherein a plurality of revolving guide holes formed in the shape of a spiral extend to a position surrounding the liquid injection opening at the front end of the liquid injection hole, the plurality of revolving guide holes introducing high speed gas into a vortex flow chamber to generate a high speed revolving flow.

It is preferable that the revolving means provided to the liquid injection hole and the gas injection hole respectively revolve in opposite directions, and that the revolving means provided to the liquid injection hole and gas injection hole respectively be provided adjacent to the liquid injection opening.

The present invention will now be explained in detail with reference to the accompanying figures.

Figure 1:
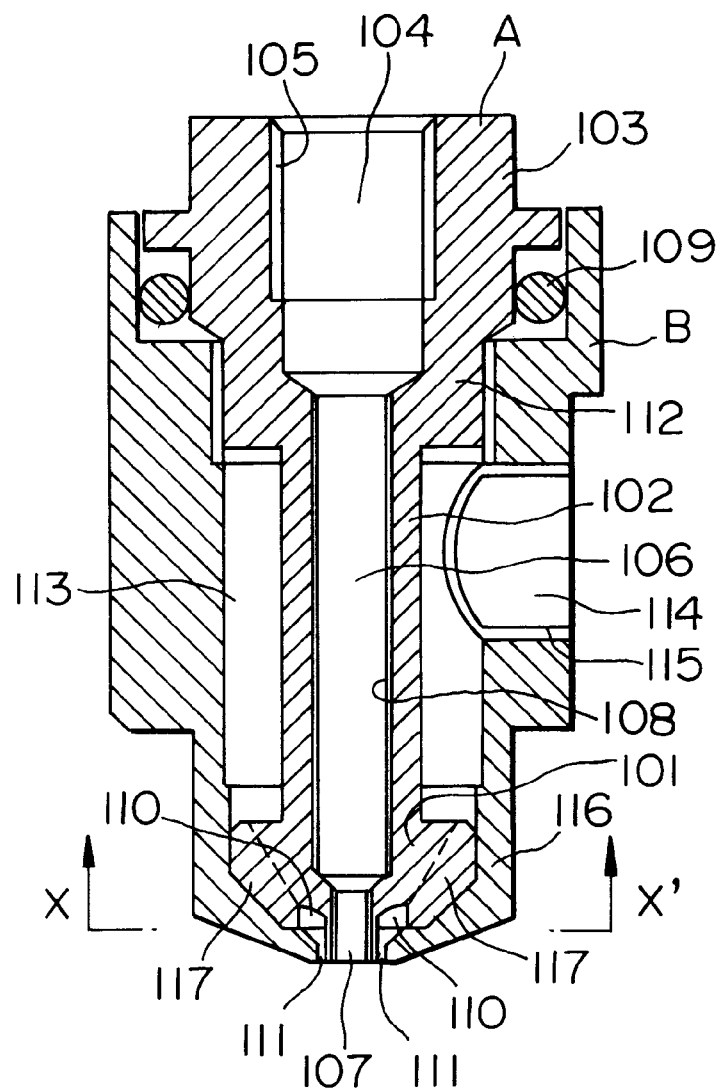
FIG. 1 is a cross-sectional view along the axis of one example of the two-fluid nozzle of the present invention.
Figure 2:
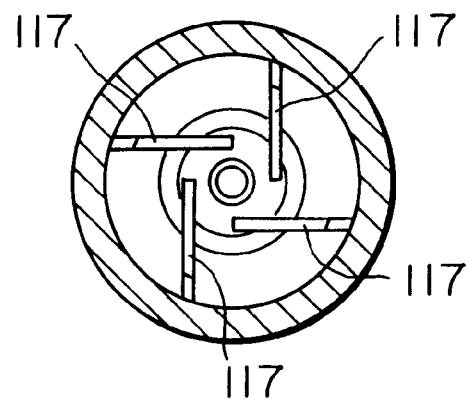
FIG. 2 is a cross-sectional view of a portion of this two-fluid nozzle taken along the X–X' line indicated in FIG.
Figure 3:
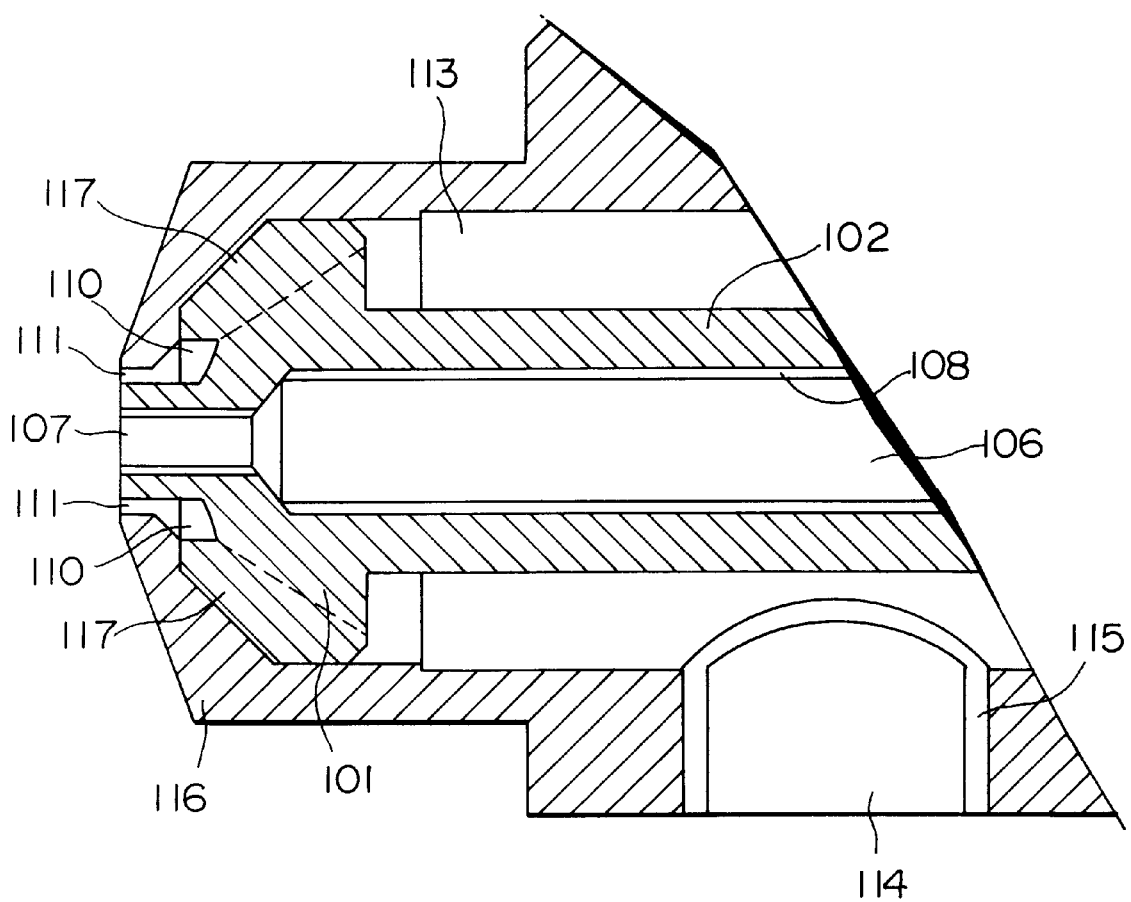
FIG. 3 is a cross-sectional view showing an enlargement of the front end portion in FIG. 1.

FIGS. 1 through 3 show an example of the two-fluid nozzle of the present invention.

This two-fluid nozzle is roughly formed of nozzle core A and nozzle outer cylinder B.

Nozzle core A is roughly cylindrical, consisting of head front end part 101, middle part 102, and base part 103. A hollow area is formed inside nozzle core A for guiding the liquid.

A screw 105 is formed on the surface of the inner wall of liquid introduction hole 104 at the rear of base part 103. Screw 105 is used to connect liquid supply tubes and the like in a liquid-tight manner. The front portion of base part 103 is joined to the cylindrical middle part 102, with a somewhat narrow-diameter liquid conveying hole 106 formed which continues from the liquid introduction hole 104 of base part 103. The front end of middle part 102 forms head front-end part 101 which has a wider diameter. A columnar liquid injection opening 107 is formed inside head front-end part 101. This liquid injection opening 107 is connected with the liquid conveying hole 106 in middle part 102, so that a liquid injection hole is formed of liquid conveying hole 106 and liquid injection opening 107. Liquid injection opening 107 has a smaller diameter than liquid conveying hole 106, with the front-end portion thereof open to the outside. Spiral grooves 108 are formed to the inner surface of liquid conveying hole 106 and liquid injection opening 107 as the revolving means.

The outer shape of head front-end part 101 is that of a truncated cone. A plurality of gas guiding grooves 117, which serve as the revolving means are formed as shown in FIG. 2 to the inclined outer surface of head end part 101. These gas guiding grooves are cut so as to be at right angles with one another. The front ends thereof extend to a ring-shaped vortex flow chamber 110 formed in the outer periphery of liquid injection opening 103.

Vortex flow chamber 110 is formed by notching out a circular groove at the front-end portion of head front-end part 101 so as to surround the outside of gas injection opening 111 which is formed at head front-end part 101. The front of vortex flow chamber 110 is continued as a ring-shaped gas injection opening 111 which forms a narrow interval of space.

Nozzle outer cylinder B is approximately cylindrical in shape and is provided to the outer periphery of nozzle core A. Nozzle core A is connected by a screw at base part 112 via O ring 109. The inner diameter of nozzle outer cylinder B is larger than the outer diameter of middle part 102 of nozzle core A. As a result, a cylindrical gas conveying path 113 is formed between nozzle outer cylinder B and nozzle core A. A gas conveying hole 114 is punched out in the middle part of nozzle outer cylinder B. This gas conveying hole 114 communicates with gas conveying path 113. A screw 115 is formed in gas conveying hole 114 so as to be joined to a gas conveying tube not shown in the figures.

The shape of the inside of front end 116 of nozzle outer cylinder B is designed so as to engage completely with the outer shape of head front-end part 101 of nozzle core A. As a result of this engagement, the gas grooves formed in nozzle core A form the four revolving guide holes 117, with vortex flow chamber 110 and gas injection opening 111 formed. The gas injection hole in this two-fluid nozzle is formed of gas conveying path 113, revolving guide holes 117, vortex flow chamber 110, and gas injection opening 111.

The direction of revolution of the four revolving guide holes 117 and spiral groove 108 formed to the inner surface of liquid injection opening 107 and liquid conveying hole 106 of nozzle core A are set so as to be opposite one another.

This embodiment shows an example in which spiral grooves 108 are formed to liquid injection hole 106 and liquid injection opening 107 as a revolving means. However, it is also acceptable to form spiral fins in place of these spiral grooves 108. It is preferable that the spiral grooves or the spiral shaped revolving direction rotate in a direction opposite the direction of revolution of revolving guide holes 117 of gas injection opening 111. Further, it is better to provide the spiral shaped grooves or fins at a position which at least connects to the liquid injection opening 107. In other respects, however, the design is not particularly limited. For example, the spiral grooves or fins may be provided across the entire inner periphery, or to just a portion thereof. In addition, a grading may be applied along the axial direction of the spiral grooves (or spiral fins). It is also acceptable for the spiral grooves or fins to extend to the flow supply side. The diameter of liquid conveying hole 106 and liquid injection opening 107 may be equal.

FIG. 2 shows an example in which four revolving guide holes 117 are formed, however, the number and shape are not thus limited. For example, the angle formed by each revolving guide hole 117 may be an angle other than 90° C. Also, the revolving guide holes need not be equally spaced. The hole shape of the revolving guide holes may be narrow and pointed, or revolving guide holes of varying size may be combined. Alternatively, a combination of the preceding variations is also acceptable.

The spiral grooves (or spiral fins) can be easily realized with the same type of mechanical processing as used in regular screw thread cutting, therefore permitting easy realization and a broad scope of design.

Figure 4:
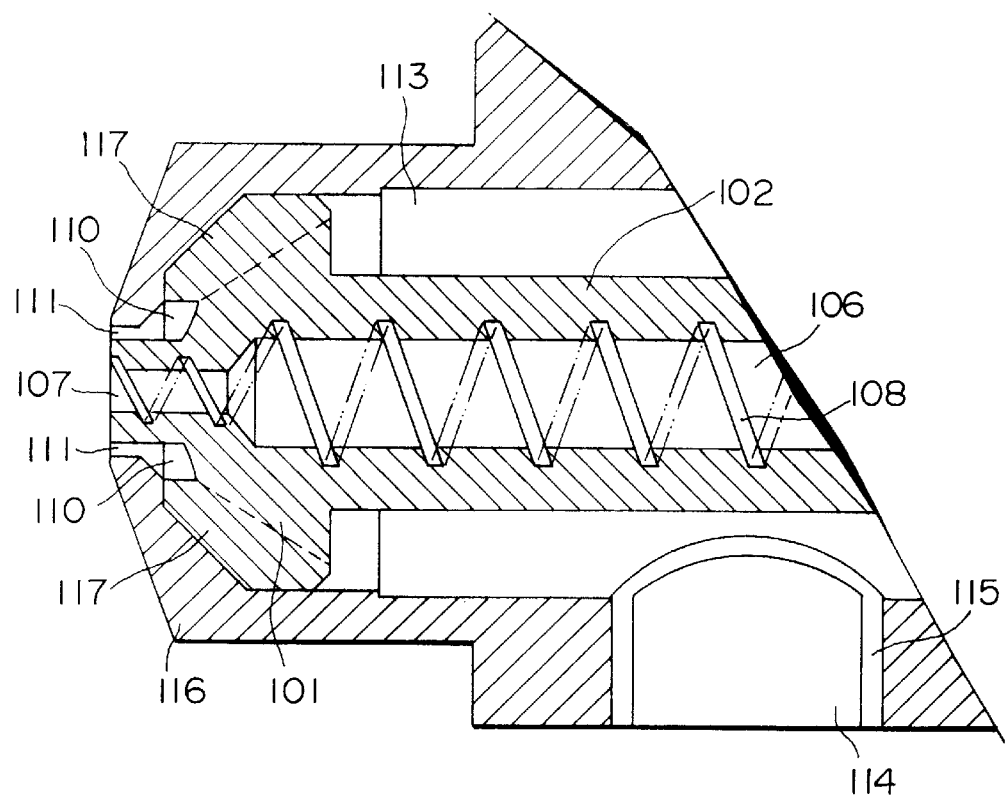
FIG. 4 is a cross-sectional view showing one example of the spiral-shaped groove provided to the liquid injection hole and the liquid injection opening.
Figure 5:
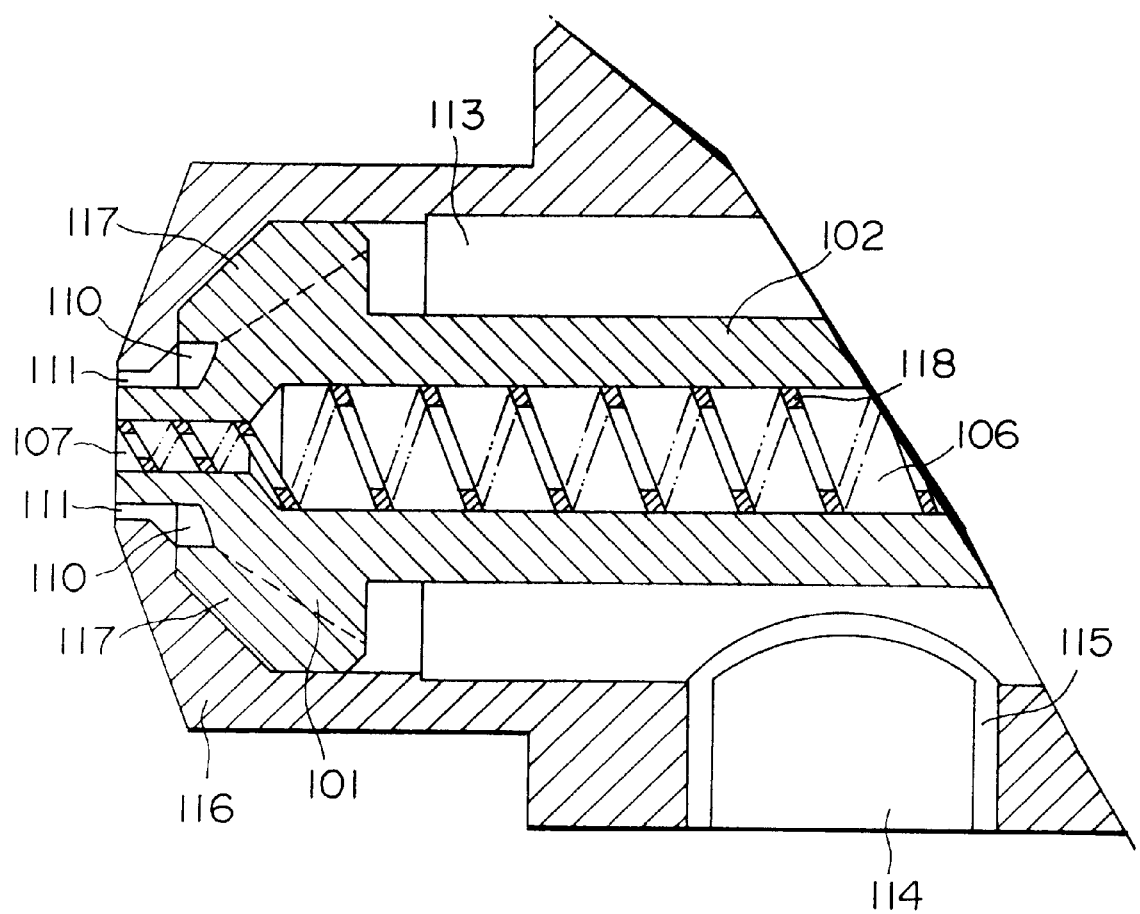
FIG. 5 is a cross-sectional view showing one example of the spiral-shaped fin provided to the liquid injection hole and the liquid injection opening.
Figure 6:
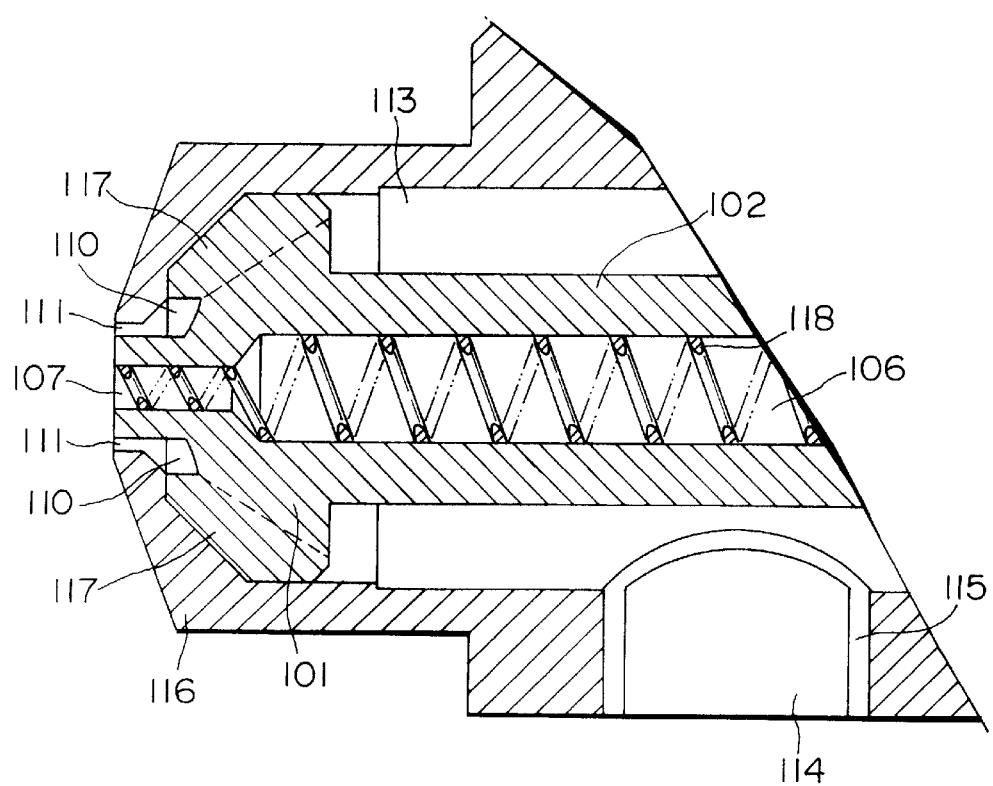
FIG. 6 is a cross-sectional view showing another example of the spiral-shaped fin provided to the liquid injection hole and the liquid injection opening.

FIGS. 4 through 6 show an example of a groove or spiral shape provided to the liquid conveying hole and liquid injection opening as the revolving means.

FIG. 4 shows an example in which a spiral groove 108 is provided to the inner wall of liquid injection opening 107 and liquid conveying hole 106. The depth and pitch of spiral groove 108 may be changed based on the properties of the liquid.

FIGS. 5 and 6 show examples of a spiral fin 118 employed in place of a spiral groove on the inner wall of liquid injection opening 107 and liquid conveying hole 106. The shape of spiral fin 118 is rectangular in cross-section in the example in FIG. 5, while the tip of the fin is in the shape of a point in the example in FIG. 6. The height and pitch of these spiral fins 118 may be changed depending on the properties of the liquid. It is not absolutely required that spiral fins 118 be made of the same materials as the two-fluid nozzle. In addition to machine working, injection molding or other such means may be employed as the manufacturing method in the case of large spiral fins 118, for example.

Figure 7:
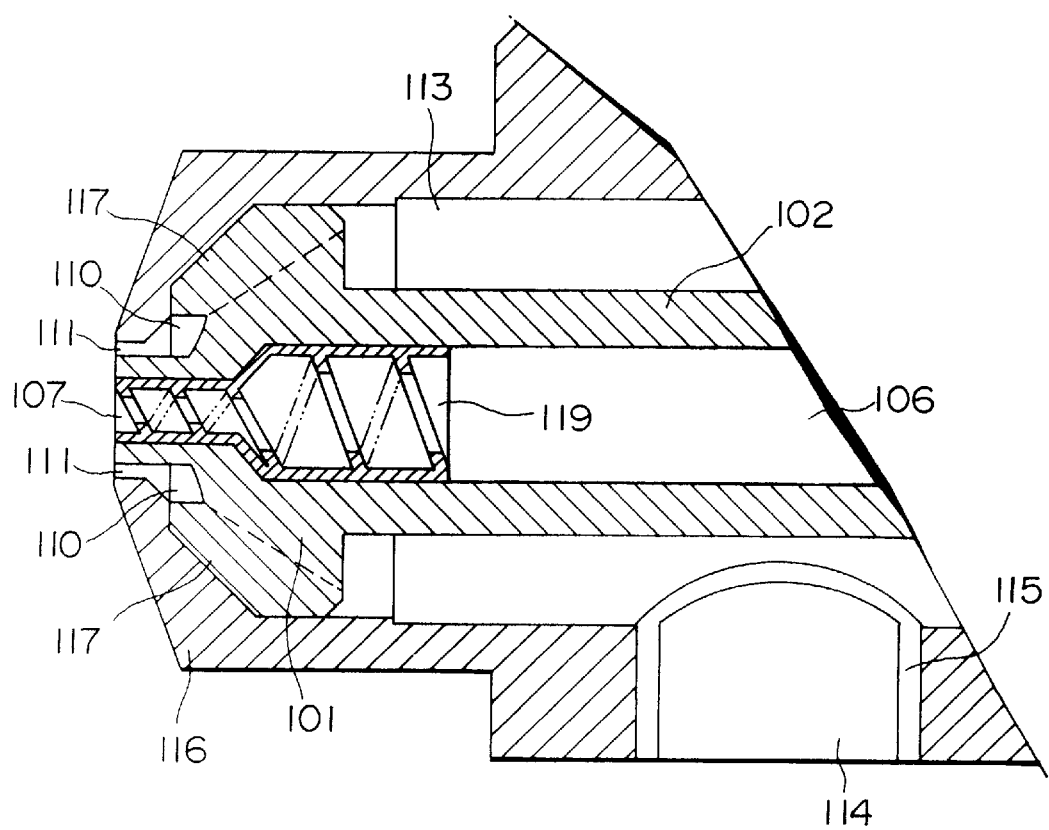
FIG. 7 is a cross-sectional view showing an example in which the cylindrical member in which the spiral-shaped fin is formed is inserted into the liquid injection opening.

Alternatively, with respect to the revolving means, it is also acceptable to form spiral grooves or spiral fins to the inner wall of cylindrical member 119 shaped to engage with liquid injection opening 107, or with liquid injection opening 107 and the front end portion of liquid conveying hole 106, and then insert cylindrical member 119 into liquid injection opening 107 as shown in FIG. 7.

In a two-fluid nozzle of the above construction, a high-speed vortex flow gas is generated by the revolving guide holes, while at the same time, a liquid vortex flow is generated by the spiral grooves or fins which preferably revolve in the opposite direction, so that in the vortex flow chamber, the liquid can be rendered into a spray as a result of these mutual effects.

The effect of vortex flow chamber 110 is believed to be from the following two points noted below. Namely, the first point is the effect of creating an even stronger vortex flow due to the accumulation of flow from revolving guide holes 117. The second point, as is clear from the structure of vortex flow chamber 110, is the intake of a vortex flow concentrated due to local negative pressure generated by depressions, while at the same time the fact that the guide holes for the gas become narrower as they approach the vicinity of the gas injection opening. For this reason, an even faster flow is generated in the vicinity of gas injection opening 111 in accordance with Bernoulli's principle. As a result, the sprayed liquid accumulates in the vicinity, increasing the pulverizing effect of the vortex flow gas. Thus, the pulverizing effect can be increased for the same fluid and gas pressure.

A two-fluid nozzle of the above structure is capable of a wide range of atomization in response to the properties of the liquid to be atomized and the particle diameter range. In particular, this two-fluid nozzle enables particles of the desired size to be obtained at a low pressure suitable for use with liquids containing vital cells.

The gas employed in the atomization of a liquid using the two-fluid nozzle of the present invention is not particularly limited, and may include dry highly pure nitrogen, dry air, inert gases or the like. However, it is preferable to select the gas according to the objective, since among microorganisms such as aerobes, anaerobes, acidophiles, or basophiles, there are those that may be effected by a specific atmosphere.

The present invention's freeze-dryer for a liquid containing a biological substance employing a two-fluid nozzle of the aforementioned structure will now be explained with reference to the figures.

The term biological substances as used in the present invention includes blood plasma and serum, as well as sugars, or biopolymers like albumin and polyvinylpyrrolidone (PVP), acids and bases, physiologically adaptive substances such as osmotic pressure regulators and metabolic regulators, and vital cells, including those of humans and other mammals. Examples of vital cells include erythrocytes, platelets, white blood cells including all the various lymphocytes, bone marrow stem cells, stem cells in the peripheral blood, egg cells, organ tissues such as liver tissue, and the like.

Figure 8:
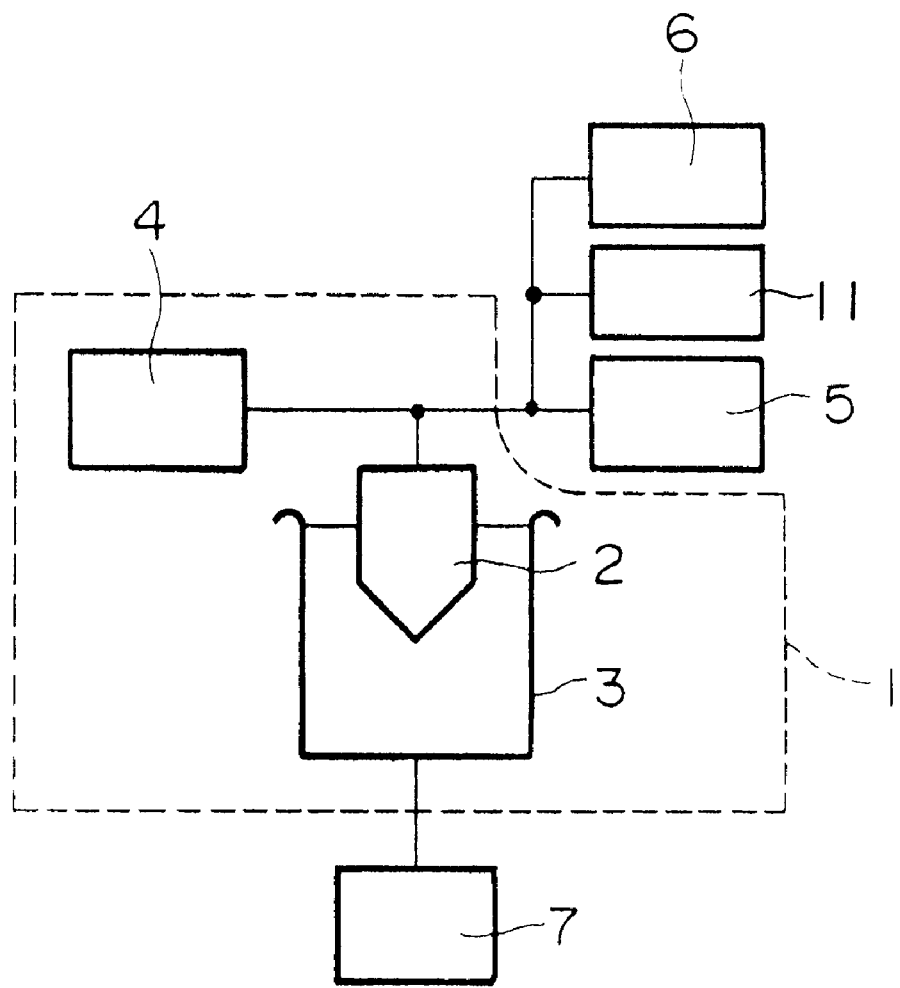
FIG. 8 is a diagram in overview showing the structure of the freeze-dryer for a liquid containing a biological substance of the present invention.

FIG. 8 is a diagram in overview showing one example of the structure of the freeze-dryer for a liquid containing a biological substance of the present invention.

In FIG. 8, freezing means 1 for freezing a liquid containing a biological substance is formed approximately of a two-fluid nozzle 2 for mixing and spraying a liquid containing a biological substance and a carrier gas; a container 3 for housing and storing the frozen liquid containing the biological substance; and a carrier gas aftertreatment member 4 for releasing the carrier gas which has been expelled from container 3. Two-fluid nozzle 2 is provided inside container 3. Biological-substance-containing liquid supply means 5, for supplying the liquid containing the biological substance which is to be sprayed, carrier gas supply means 11, and nozzle internal cleaning means 6 are connected in parallel to two-fluid nozzle 2. Drying means 7 for sublimating the moisture inside container 113 is connected to container 3.

An embodiment of the freeze-dryer for a liquid containing a biological substance of the present invention will now be explained in detail based on FIG. 9.
(Two-Fluid Nozzle)

The aforementioned two-fluid nozzle 2 mixes and sprays a carrier gas and a liquid containing a biological substance inside container 3, and employs the structure described above.

The control of particle size when atomizing a liquid containing a biological substance can first be carried out by changing the nozzle diameter of two-fluid nozzle 2. In other words, the liquid containing a biological substance which is to be mixed and sprayed is dispersed by being rendered into different particle sizes (cluster sizes in which a plurality of red blood or other vital cells aggregate) depending on the nozzle diameter of two-fluid nozzle 2. For example, when employing a two-fluid nozzle 2 having a 1.2 mm nozzle diameter, a relationship exists between the pressure of the carrier gas and the flow volume of the liquid containing the biological substance. If the flow volume of the liquid containing the biological substance is set within the range of 1–20 cc/min and the carrier gas pressure is set within the range of 0.5–6 kg/cm$^2$, then a particle size can be obtained in which the average particle diameter is from several to 40 microns. If the nozzle diameter of two-fluid nozzle 2 is increased, then the particle size becomes larger. Thus, it is possible to control particle size and the amount processed of the liquid containing the biological substance.

In addition, by employing this two-fluid nozzle, it is possible to atomize a liquid containing a biological substance, including the cells cited above. Moreover, this two-fluid nozzle enables an atomization in which there is a narrow particle size distribution such that the particle sizes are uniform.
(Heater)

A heater 8 is provided adjacent to or in the vicinity of two-fluid nozzle 2. When the supply of the liquid containing a biological substance must be temporarily stopped, this heater 8 prevents the two-fluid nozzle from icing and impeding the continuous resupply of the liquid containing the biological substance. As a result, it is possible to continuously freeze and dry the liquid containing the biological substance. Moreover, the lipids forming the vital cells generally have a glass transition temperature (Tg) that is body temperature or below (and 0° C. or above). Since these lipids undergo glass transition at the Tg or below, atomization at the two-fluid nozzle must be carried out at a temperature which is at least above the Tg and below body temperature. Since the cells may burst and die if the temperature exceeds body temperature, a temperature which is approximately body temperature or below is desirable. For example, in the case of human erythrocytes, this temperature is around 15° C., so that it is necessary to control the temperature to be 15° C. or above and 40° C. of below and preferably 20° C. or above and 37° C. or below.

A variety of heaters or heating elements may be suitably employed for heater 8, provided they can prevent icing at two-fluid nozzle 2.

It is even more preferable to provide a heater or other such heating member (not shown in figures) in the vicinity of carrier gas exhaust means 9 (explained below) since this prevents an increase in the internal pressure of the container due to icing.

(Cleaning Means)

A nozzle surface cleaning means 10 is provided adjacent to two-fluid nozzle 2. Nozzle surface cleaning means 10 is for cleaning the surface of two-fluid nozzle 2 when the supply of the liquid containing a biological substance must be temporarily stopped, or when a new lot of a liquid containing a biological substance is to be processed. As a result, clogging of the two-fluid nozzle can be prevented, enabling continuous freezing of the liquid containing a biological substance. The nozzle cleaning member may employ a physical method such as wiping, may clean by employing a cleaning liquid to which the entire two-fluid nozzle is transferred (not shown), or may employ a combination of these methods.

(Carrier Gas Supply Member)

Carrier gas supply member 11 is connected to two-fluid nozzle 2. Carrier gas supply member 11 is composed of a carrier gas cylinder for storing the carrier gas; carrier gas supply tube 13 for supplying the carrier gas from the carrier gas cylinder to the two-fluid nozzle; and a carrier gas supply valve 14 provided to carrier gas supply tube 13. The pressure and flow volume of the carrier gas supplied can be controlled by a pressure reducing valve and flow meter (not shown).

(Biological-substance-containing Liquid Supply Means)

Biological-substance-containing liquid supply means 5 consists of a liquid-containing-biological-substance-fill container 15 to be filled with the liquid containing the biological substance to be supplied; a liquid-containing-biological substance-supply tube 16 for supplying the liquid containing the biological substance from liquid-containing-biological substance-fill container 15 to two-fluid nozzle 2; and a liquid-containing-biological substance-supply valve 17 provided to the liquid-containing-biological substance supply tube. In addition, in this embodiment, nozzle internal cleaning means 6 consists of cleaning liquid reservoir 18, and is formed in a unitary manner with biological-substance-containing liquid supply means 5. Pressure applying member 19 is connected to liquid-containing-biological substance-fill container 15 and cleaning liquid reservoir 18. As needed, this pressure applying member 19 can control the flow volume and pressure of one or both of the liquid containing the biological substance and the cleaning liquid.

With respect to the method for controlling the pressure and flow volume of one or both of the liquid containing the biological substance and the cleaning liquid, it is preferable to control the pressure to be 5 kg/cm² or less, and preferably, to be 3 kg/cm² or less. The means for this control may be automatic, semi-automatic or manual. Similarly, the carrier gas and liquid may be supplied such that their respective pressure and flow volumes are independent, or at a suitable value in which there is a relationship therebetween.

Nozzle internal cleaning means 6 is for cleaning the inside of two-fluid nozzle 2 and liquid-containing-biological substance-supply tube 16, and is designed to stop the supply of the liquid containing the biological substance, supply a cleaning liquid from cleaning liquid reservoir 18, and spray the cleaning liquid into a cleaning container (not shown) which has the same structure as container 4, for example.

Nozzle internal cleaning means 6 may be designed to flush gas instead of a cleaning liquid. The gas employed in this case may be the same as the carrier gas, or a different dry gas.

In particular, when continuously freeze-drying a large amount of a liquid containing a biological substance, in the case where a large amount of the liquid containing the biological substance is sprayed into a large container and freeze-dried, the case where the liquid containing the biological substance is separated into numerous containers and freeze-dried, or the case where a liquid containing biological substances of different compositions are continuously freeze-dried, for example, it is necessary to appropriately clean the inside of two-fluid nozzle 2 or liquid-containing-biological substance-supply tube 16. Accordingly, this nozzle internal cleaning means is essential.

(Container)

Container 3 is provided with a container lid 20 capable of sealing the inside of container 3. In the sealed state, the front end of two-fluid nozzle 2 is disposed inside the container.

Container 3 may be designed so that the spray-dispersed liquid containing the biological substance accumulates inside the container itself which is in direct contact with cooling medium 21. Alternatively, container 3 may be designed so that a flexible container (not shown) consisting of a flexible material such as plastic is disposed to seal the inner wall of container 3 and the spray-dispersed liquid containing the biological substance accumulates inside the flexible container, with the flexible container indirectly in contact with the cooling medium.

In the latter case, a plastic bag typically employed for transfusion blood may be suitably used as the flexible container disposed in contact with the inner wall of the container. Employing this type of flexible bag used for transfusion blood enables removal without coming into contact with the outside air after freezing and/or drying, and storage in another storage container (not shown). Moreover, use of these plastic bags is not only suitable for serial production during drying and storage, but also increases volume and reduces cost.

Container 3 may be metallic or of another material. Namely, any material is acceptable for container 3 provided that it has good thermal conductivity. However, it is preferable to employ a material that is repellent or highly repellent with respect to the liquid for container 3 and all or part of the material provided to the inside of container 3, and in particular the nozzle surface or the lid. A repellent or highly repellent material is a material in which the angle of contact with respect to water is 110° or more, or exceeds 140°, and may be composed of fluorine- or silicon-derived materials, or composites thereof.

(Cooling Means)

The freezing means is provided with a cooling means 22 which employs cooling medium 21, and cools container 3 by means of this cooling medium 21.

Figure 10:
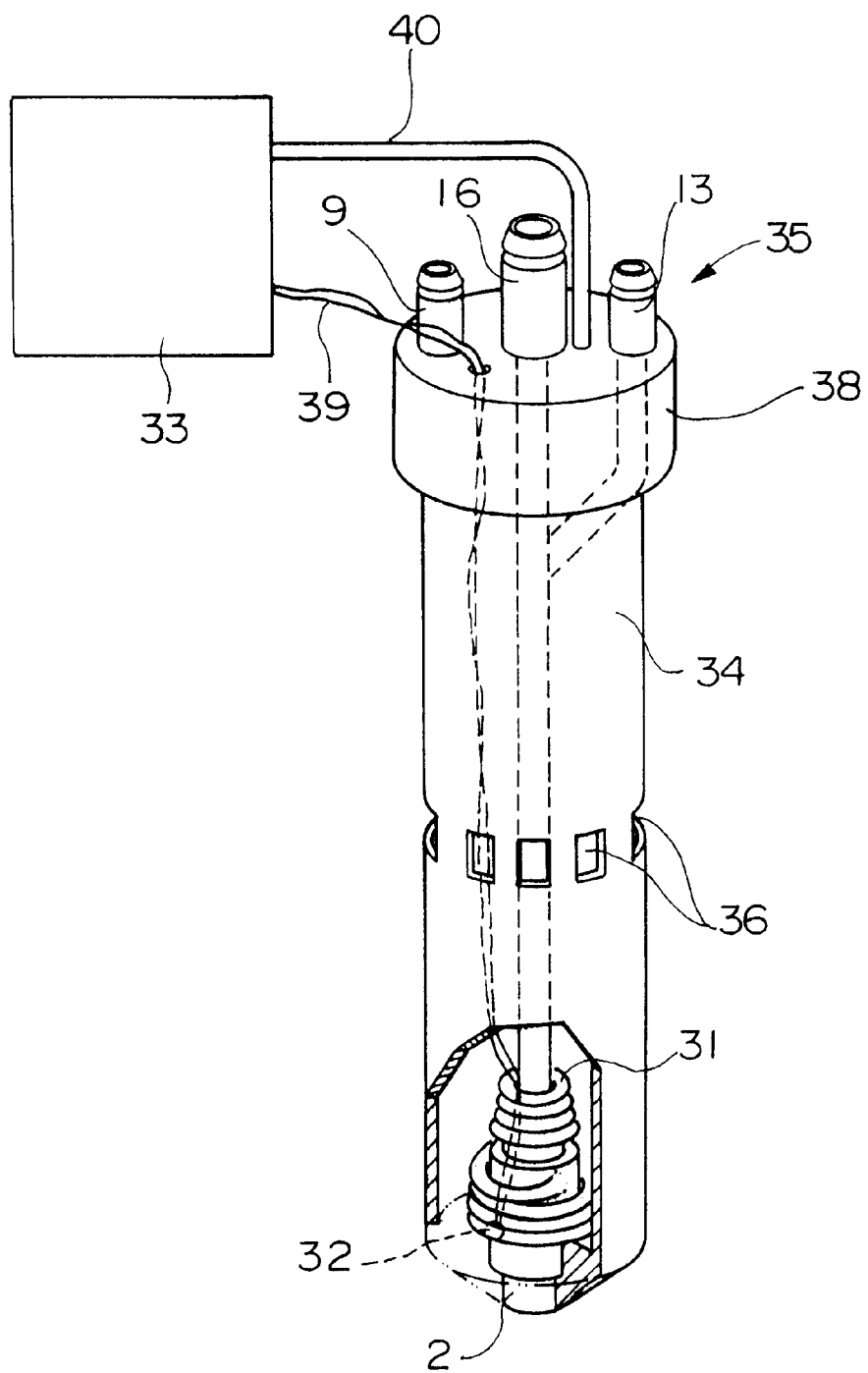
FIG. 10 is squint view showing one example of the nozzle assembly employed in the freeze-dryer for a liquid containing a biological substance of the present invention.
Figure 11:
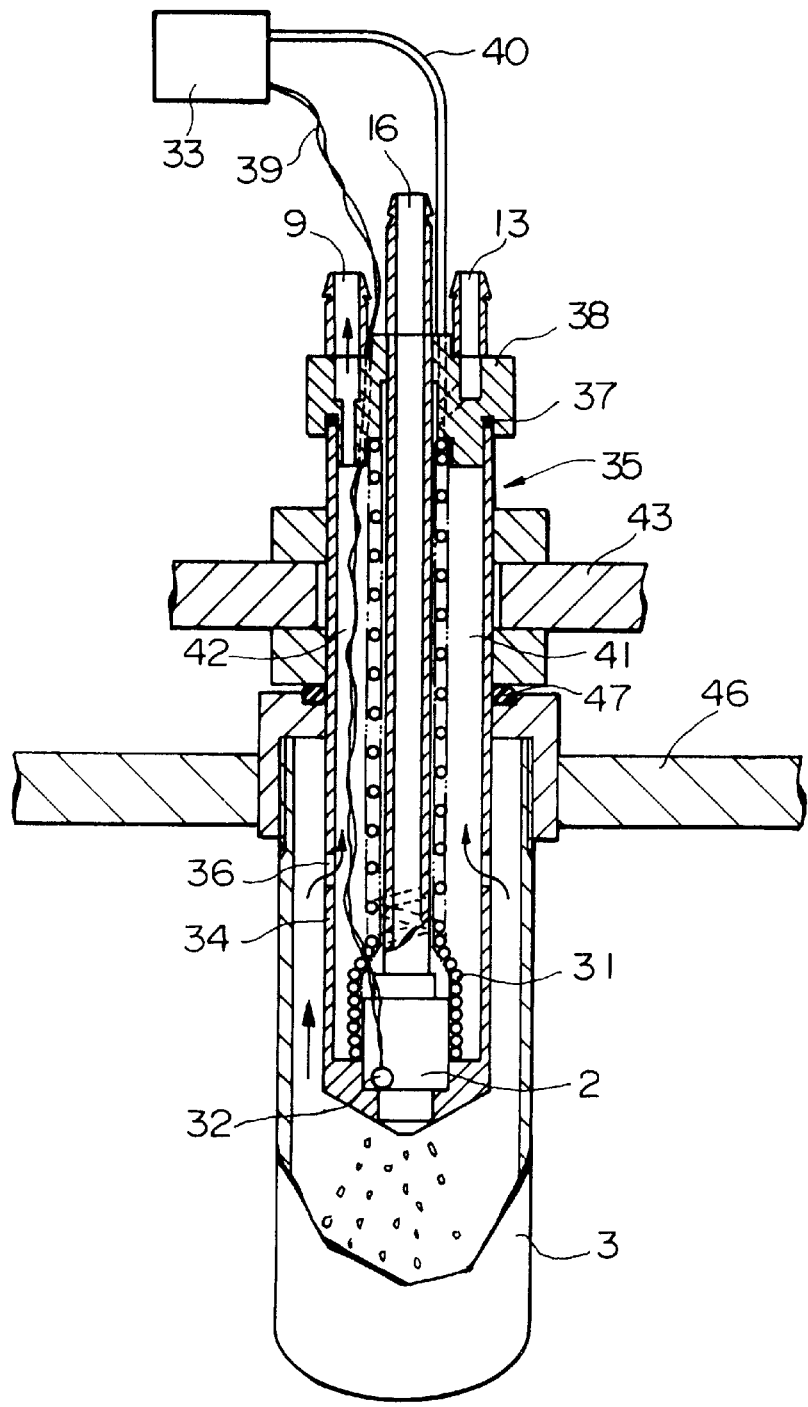
FIG. 11 is a partial cross-sectional view showing the arrangement when the nozzle assembly in FIG. 10 is inserted into the container.
Figure 12:
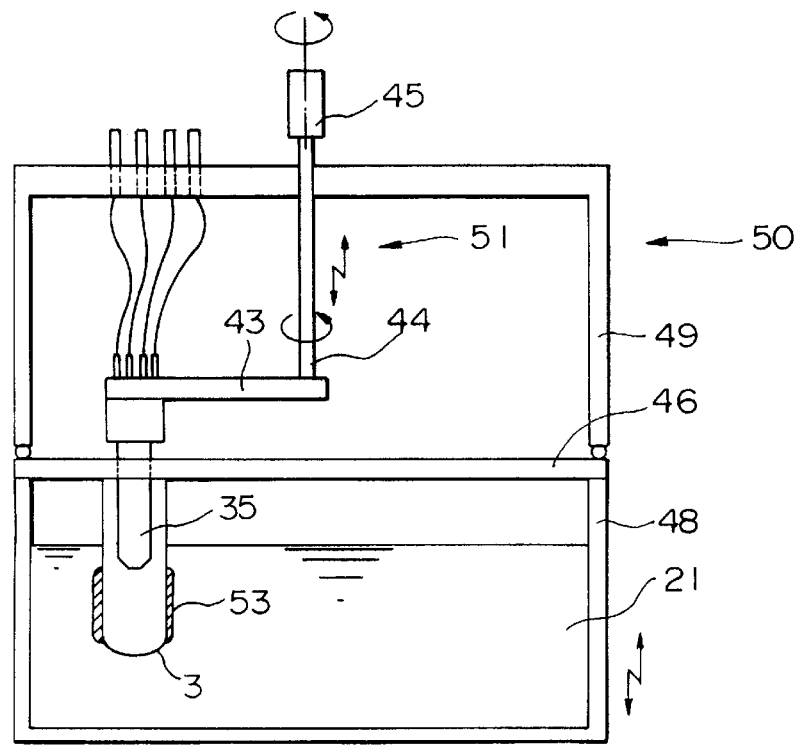
FIG. 12 is a lateral cross-sectional view of one embodiment of the freeze-dryer for a liquid containing a biological substance of the present invention, showing the positional relationship between the container and the nozzle assembly.
Figure 13:
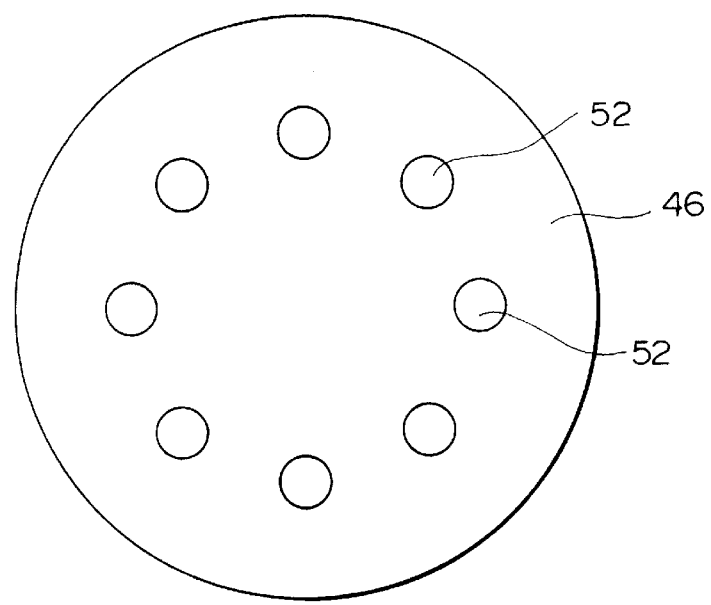
FIG. 13 is a planar view of one embodiment of the freeze-dryer for a liquid containing a biological substance of the present invention, showing the container fixing member.

Cooling means 22 employs the holding or flow of liquid nitrogen, liquid helium, liquid $CO_2$, or other such cooling mediums, and may be any means provided that it is capable of rapid cooling via container 3 of the mixed and sprayed liquid containing the biological substance. However, liquid nitrogen or the like is preferably employed for cooling medium 21. Liquid nitrogen has an extremely low temperature of about—196° C. Thus, by employing liquid nitrogen for cooling medium 21, effective cooling via container 3 of the mixed and sprayed liquid containing the biological substance is possible.

In order to carry out the sublimation process with high efficiency after freezing the liquid containing a biological substance, a means (not shown) for heating container 3 may be provided. A typical arrangement may be employed for this heating means.

(Aftertreatment of Carrier Gas)

The inside of container 3 and carrier gas aftertreatment member 4 are connected via carrier gas exhaust means 9, which is provided passing through container lid 20, so as to be opened and closed by a valve 23. Carrier gas aftertreatment member 4 is formed of carrier gas filters 24,25. When valve 23 is released, the carrier gas passes in order from container 3 to carrier gas exhaust means 9, carrier gas filter 24, and carrier gas filter 25. After the liquid or bacteria contained in the carrier gas are removed, the carrier gas is expelled via carrier gas discharge end 26.

Carrier gas filter 24 may be formed of a structure which bubbles water or an aqueous solution having an osmotic pressure of 50 mOsM (milliosmoles) or less, and/or a disinfecting liquid. The aqueous liquid and/or the disinfecting liquid dissolve or lyse the liquid containing the biological substance which was not captured in the freezing container, and/or sterilize and disinfect the liquid. Specifically, hypochlorous acid soda or the like may be employed as the disinfecting liquid.

A disinfecting filter or air filter may be employed for carrier gas filter 25.

(Drying Means)

The inside of container 3 and vacuum pump 28 are connected via degassing tube 27, which is provided passing through the lid of the container, and can be opened or shut via valve 29. If valve 29 is open and vacuum pump 28 operates, then the sprayed and dispersed liquid containing the biological substance can be dried inside container 3.

The method employing the device of the present invention for freeze-drying blood components containing cells (herein after referred to simply as "blood") will now be explained.

It is preferable to employ freeze-dried blood after it has been subjected to the pretreatment described below. First, centrifuging or a similar method is used to obtain concentrated erythrocytes, having a hematocrit of 55~90% for example, from collected blood. The concentrated erythrocytes are then mixed with a pretreatment liquid at an appropriate mixing ratio (admixture). As an example of the pretreating liquid, a solution containing at least one of a sugar, biopolymer, or acid or acid salt, may be employed, as described in Prior Application, Japanese Patent Application, No. Hei 7-32718. The usual methods, such as stirring, vibrating or the like, may be employed for mixing the concentrated erythrocytes and the pretreating liquid. In addition, in the mixing method, the blood may be poured into the pretreatment liquid, or the pretreating liquid may be poured into the blood. It is preferable to add the pretreatment liquid to the blood while admixing.

As examples of the sugars included in the pretreatment liquid, at least one of mannose, xylose, glucose, trehalose, sucrose, or maltose may be included.

As examples of the biopolymers included in the pretreatment liquid, at least one of dextran, phosphoric ester salts, polyvinylpyrrollidone (PVP), or albumin may be included.

As examples of the acids or acid salts included in the pretreatment liquid, at least one of phytinic acid (also known as: inositol hexaphosphoric acid, IHP), pyrophosphate, adenosine triphosphoric acid(ATP), or 2,3-diphosphoglycerine (2,3-DPG) may be included.

The pH of the pretreatment liquid is controlled to be in the range of 4 to 9, and preferably in the range of 7.0 to 8.0. For example, a pH in the range of 4 to 9, and preferably 7.0 to 8.0, can be obtained by adding one or more of the aforementioned sugars, biopolymers, acid or acid salts to a phosphate buffer in which a physiological electrolyte has been added to a buffer solution consisting of disodium hydrogenphosphate ($Na_2HPO_4$) and potassium dihydrogenphosphate ($KH_2PO_4$).

Blood fill container 15 is then filled with this pretreated blood. Valves 14 and 17 are then operated to supply the carrier gas and the blood to two-fluid nozzle 2, from which they are mixed and sprayed into container 3. The pressure and flow volume of the carrier gas are controlled by a pressure-reducing valve and flow meter (not shown). Similarly, the supply pressure and flow volume of the blood are controlled by pressure applying member 19. Using pressure applying member 19, the carrier gas and blood may be supplied such that their respective pressure and flow volumes are independent, or at a suitable value in which there is a relationship therebetween.

The blood mixed and sprayed inside container 3 forms particles, preferably having a diameter of tens of microns. The particles adhere to the inside wall of container 3 and are instantly frozen.

After spraying atomized liquid, the carrier gas is guided to carrier gas filters 24,25 via carrier gas exhaust means 9 and the blood which is not captured in the freezing container is lysed and/or sterilized and disinfected, and then expelled into the atmosphere.

After atomization and freezing inside the container, valves 14 and 17 for supplying the carrier gas and the blood, and valve 23 for expelling the carrier gas, are closed. Container 3 is separated from cooling means 22. Valve 29 for degassing tube 27 is opened, and degassing is performed by vacuum pump 28. The frozen blood is below freezing point. In particular, when liquid nitrogen is employed in the cooling medium, then the mixture is initially at an extremely low temperature. Accordingly, dehydration occurs during the so-call sublimation process. In addition, in order to increase the efficiency of the sublimation, container 3 may be heated using a heater or the like (not shown) as needed.

The freeze-dried blood can be obtained following freezing and drying of the blood in the above process. The thus-obtained freeze-dried blood may be stored in a regular refrigerator (temperature 5° C.). At the time of use, the freeze-dried blood may be reconstituted using a restoring solution having the same composition as the pretreatment liquid, washed with physiological saline, and them employed in a transfusion.

The device of the present invention for freeze-drying a liquid containing a biological substance was explained above using an example of freeze-drying of blood components. However, other liquids containing biological substances, such as for example, lymphatic liquids, tissue liquids, or liquids containing a tissue portion may also be freeze-dried in the same way.

FIGS. 10 through 13 show other preferred embodiments of the device of the present invention for freeze-drying a liquid containing a biological substance.

FIGS. 10 through 13 show an example of a device wherein a temperature sensor 32, for detecting the temperature of heating heater 31, and a temperature controller 33, for controlling the temperature of heating heater 31 within a specific temperature range, are connected to heating member 8 (heating heater 31), in order to prevent icing in two-fluid nozzle 2; and two-fluid nozzle 2, heating heater 31, and temperature sensor 32 are housed in the same housing 34 to form nozzle assembly 35. FIG. 10 is a squint view of nozzle assembly 35. FIG. 11 is a cross-sectional view of nozzle assembly 35. FIG. 12 is a side view of a device provided with this nozzle assembly 35.

Housing 34 is roughly cylindrical and is open at the top and bottom. It is preferably formed out of a metallic material. The bottom (front-end portion) of housing 34 is approximately truncated. A plurality of air passage holes 36 are punched out in the center of housing 34. A cap 38 engages at the upper opening of housing 34 with an O-ring 37 held therebetween. A space interval 41 is formed inside the housing.

The front end of two-fluid nozzle 2 is directed downward to engage in the center of the bottom of housing 34. Five holes are formed in cap 38, through which carrier gas supply tube 13, liquid-containing-biological substance-supply tube 16, exhaust means (exhaust tube) 9, sensor lead wire 39, and heater lead wire 40, respectively, are inserted. Of these, carrier gas supply tube 13 and liquid-containing-biological substance-supply tube 16 extend further downward to connect to the base of two-fluid nozzle 2. Sensor lead wire 39 is connected to temperature sensor 32 explained below, while heater lead wire 40 is connected to heating heater 31.

Figure 9:
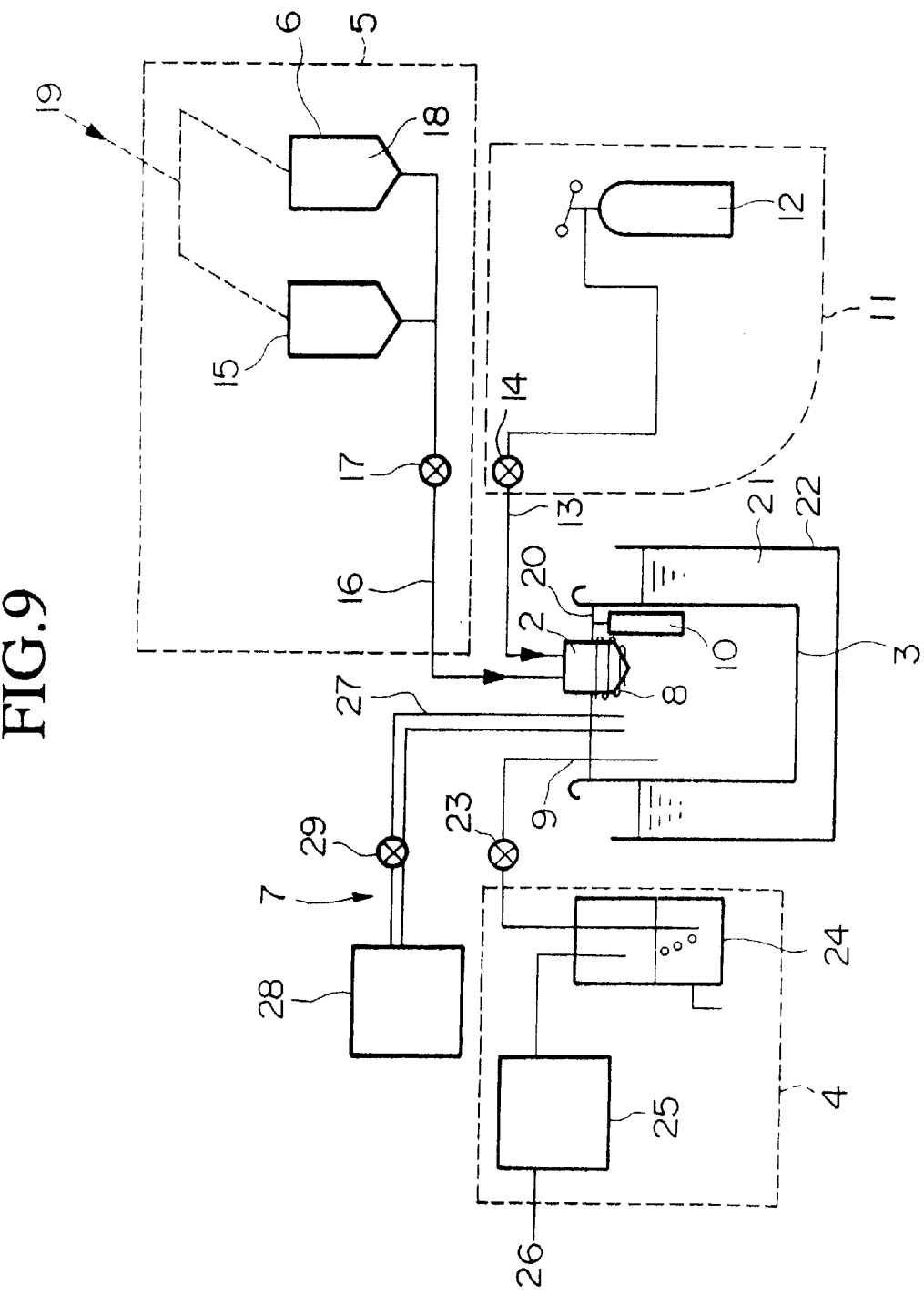
FIG. 9 is a structural view showing one embodiment of the freeze-dryer for a liquid containing a biological substance of the present invention.

As in the case of the example shown in FIG. 9, in the examples shown in FIGS. 10 and 11, the other end of carrier gas supply tube 13 is connected to the carrier gas cylinder, the other end of liquid-containing-biological substance-supply tube 16 is connected to the liquid-containing-biological substance-fill container and/or the cleaning liquid reservoir, and exhaust tube 9 is connected to the carrier gas aftertreatment member (not shown).

Air passage holes 36 . . . punched in housing 34 are for guiding the sprayed carrier gas from inside the container to space interval 41 inside the housing in order to exhaust the carrier gas to the outside. In other words, the inside and outside of housing 34 communicate by means of communicating holes 36 . . . and exhaust tube 9, with exhaust tube 9 connected to an exhaust means (not shown). As a result, an exhaust path 42 is formed as indicated by the arrow in FIG. 11 for exhausting the sprayed carrier gas to the outside of container 3 via air holes 36 . . . , housing internal space interval 41 and exhaust tube 9. Due to the provision of this exhaust path 42, spraying within a small sealed container becomes possible. When spraying is carried out within a large container, it is acceptable to increase the number of air holes 36 . . . or exhaust tubes 9.

Heating heater 31 is coiled around the outer periphery of two-fluid nozzle 2 and the outer periphery of liquid-containing-biological substance-supply tube 16 facing housing internal space interval 41. At the same time, heating heater 31 extends upward to connect to temperature controller 33 via heater lead wire 40. Heating heater 31 is mainly for preventing icing of two-fluid nozzle 2 which faces the container which has been cooled to a very low temperature. As shown in FIG. 11, it is preferable to wrap heating heater 31 around the periphery of two-fluid nozzle 2 tightly. When giving consideration to the glass transition temperature Tg of the lipids which constitute the cells, however, it is necessary to control the temperature to be higher than the Tg and lower than the temperature of the vital cells, and preferably to be within the range of 20–37° C. By wrapping the upper part of heating heater 31 around the periphery of liquid-containing-biological substance-supply tube 16, exhaust path 42 can be heated, thus also preventing icing there.

Temperature sensor 32 is provided so as to be positioned near the front end of two-fluid nozzle 2, and is connected to temperature controller 33 via sensor lead wire 39. Temperature sensor 32 detects the temperature at the front end of two-fluid nozzle 2 and sends a signal to temperature controller 33. Temperature controller 33 receives the signal from temperature sensor 32, and detects the difference between the received signal and a specific set temperature. Temperature controller 33 controls the current supplied to heating heater 31 so that the specific temperature range is typically 0° C. or more and 40° C. or less, and preferably, the Tg or more for the lipids composing the vital cells and the temperature of the vital cells or less, i.e., 20° C. or more and 37° C. or less in the case of human erythrocytes, for example. Any control method may be employed, with PID control acceptable, for example. Thus, control of the system is performed so that two-fluid nozzle 2 is maintained at an appropriate temperature, preventing freezing of the liquid containing the biological substance inside two-fluid nozzle 2.

Container 3 is held in place by container fixing member 46. Housing 34 is supported by arm 43. This arm 43, which is connected to rotational column 44, motor 45 and the like (see FIG. 12), is designed to operate motor 45 in order to transfer nozzle assembly 35 in at least an up and down, left and right, or rotational direction via rotational column 44 and arm 43, thereby inserting nozzle assembly 35 into or removing nozzle assembly 35 from container 3.

As arm 43 is lowered, nozzle assembly 35 is inserted from above container fixing member 46 into the opening at the top of container 3, with packing (O-ring) 47 pressed therebetween. Packing 47 maintains the seal within container 3 when the carrier gas and the liquid containing the biological substance are mixed and sprayed. The carrier gas accompanying the spray of the liquid containing the biological substance is exhausted via exhaust path 42, i.e., air holes 36 . . . , housing internal space interval 41, and exhaust tube 9, after freezing of the liquid containing the biological substance. During this time, two-fluid nozzle 2 is controlled to maintain its temperature within a constant temperature range, thus, it is possible to provide a stable spraying operation without freezing.

FIG. 12 shows an example of a device capable of carrying out simultaneous vacuum drying in a serial operation by separating the liquid into a plurality of containers.

The device shown in FIG. 12 is roughly composed of a chamber 50, consisting of a cooling medium tank 48 and lid 49; container fixing member 46, attached to the inside of chamber 50; nozzle assembly 35; nozzle attaching/releasing means 51 for attaching and releasing the nozzle assembly; and container temperature controlling means 53 for controlling the temperature of the container during vacuum drying.

As shown in FIG. 13, container fixing member 46 is disk-shaped with a plurality of container attaching holes 52 formed therein. Container fixing member 46 is attached horizontally inside chamber 50, near the center thereof. Screw members are formed to container attaching holes 52. Due to engagement with these screw members, container 3 becomes attached at a position so that at least the front end thereof is submerged in cooling medium 21. Because a plurality of container attaching holes 52 are formed in container fixing member 46 in this way, the attachment of a plurality of containers (not shown) becomes possible.

The number of container attaching holes 52 may be optionally selected. The disposition of these container attaching holes 52 is not limited to the same outer periphery. Rather container attaching holes 52 may be disposed along a straight or curved line.

Nozzle attaching/releasing means 51 is formed of arm 43, rotational column 44, and motor 45. Nozzle assembly 35 is supported by arm 43 as described above. Arm 43, which can be moved up and down, left and right, or rotated by rotational column 44 and motor 45, is designed to continuously perform the operations of determining the positioning of nozzle assembly 35 over a specific container, inserting the container, removing the container and determining its positioning over the neighboring container. In the example shown in FIG. 13, containers 3 are disposed on container attaching member 46 around the same periphery. Thus, by rotating or moving arm 43 up or down, the continuous insertion and removal of nozzle assembly 35 can be carried out.

A drying means not shown in the figures is attached to the device shown in FIG. 12, and is designed so that the entire inside of chamber 50 can be vacuum dried. Alternatively, a design is also acceptable which provides a capping means (not shown) in which a lid (not shown) through which a tube passes is placed on individual containers 3 from which nozzle assembly 35 has been removed after spraying and drying. Vacuum drying of the inside of container 3 is then performed by attaching the drying means to the tube.

The liquid nitrogen or other such cooling medium employed during freezing may also be used for the container temperature controlling means 53 for controlling the temperature of container 3 during vacuum drying. Preferably, however, a method for controlling the temperature using a Peltier element or the like may also be used. This temperature control is a parameter for determining the execution and efficiency of the sublimation process during vacuum drying. In general, provided the temperature is within the range at which sublimation can be carried out, then the higher the temperature, the greater the efficiency. Thus, a heating means such as a heater may also be used as required. A means for supplying current is connected to the Peltier element (not shown).

Methods for using the nozzle assembly shown in FIGS. 10 through 12 will now be explained.

Container 3 is attached so as to be submerged in cooling medium 21. Motor 45 is operated to move rotational column 44 and arm 43, and nozzle assembly 35 is inserted after determining its positioning.

A liquid containing a biological substance which has been pretreated by an above-described method and has been used to fill a syringe, blood pack or other such liquid-containing-biological substance-fill container, is supplied to two-fluid nozzle 2 via liquid-containing-biological substance-supply tube 16, while a carrier gas is supplied to two-fluid nozzle 2 via carrier gas supply tube 13 from the supply member of a cylinder or the like. The liquid containing the biological substance and the carrier gas are then sprayed within container 3.

During spraying, cooling medium 21 cools container 3 to 0° C. or less, and preferably to −196° C. when liquid nitrogen is used. The liquid containing the biological substance which is sprayed inside the container is instantly frozen due to super rapid cooling from a temperature of 0–40° C. to −196° C. At the same time, a valve (not shown) attached to exhaust tube 9 is opened, and the carrier gas comprising a portion of the sprayed flow (liquid containing biological substance) is expelled from inside container 3 via air holes 36 . . . formed in housing 34, housing internal space interval 41, and exhaust tube 9, as indicated by the arrow in FIG. 11.

Following completion of spraying, nozzle assembly 35 is removed from the container by the upward movement of arm 43. Next, positioning of nozzle assembly 35 over the neighboring container is determined by the rotating arm 43 and rotational column 44. Arm 43 is then lowered to insert nozzle assembly 35 into the container. The same operation is then repeated. In this way, spraying inside each of the containers can be intermittently performed. Once spraying within the last container is completed, nozzle assembly 35 is removed from this container. By operating the drying means and opening the valve, the inside of the chamber may be vacuum dried at once while each of the containers is still attached.

Alternatively, in the case of a device provided with a capping means, the capping means may be operated to place a lid through which a tube passes onto the opening at the top of the container. Drying means 7 may then be attached to this tube, and vacuum drying of the inside of the container performed.

Cooling medium 21 employed during freezing may be used to hold the temperature at 0° C. or less during vacuum drying as required. Alternatively, the temperature may also be controlled using a Peltier element or the like. In general, provided the temperature is within the range at which sublimation occurs, then the higher the temperature, the greater the efficiency. Thus, a heating means such as a heater may also be used as necessary.

(Embodiments)

A two-fluid nozzle having the structure shown in FIGS. 1 through 3 was formed (liquid injection hole diameter: 1.5 mm, spiral groove pitch: 2 mm, depth of spiral groove: 0.8 mm). This two-fluid nozzle was employed to atomize a erythrocyte flocculant having a hematocrit of 40 to 60%. Dry high purity nitrogen was employed for the gas, with the gas pressure varied.

A particle size distribution measuring device employing laser light scattering was used to measure the size of the particles generated. A known measurement principle was employed, namely, the atomized particles were struck by laser light, the scattering pattern from the particles was detected at a detector, particle size distribution functions (Rosin-Rammler's function, etc.) matching this pattern were determined, and the optimal parameter was determined by calculation.

The relationship between the average particle size and the pressure of the pressurized gas had the limits indicated by region a (i.e., region a1, region a2, and region a3) in FIG. 14, which is surrounded roughly by a large quadrilateral.

For comparative purposes, the same experiments were carried out using the two-fluid nozzle (diameter of injection hole: 1.2 mm) disclosed in Japanese Patent Application, First Publication, No. Hei 4-21551. Water and a erythrocyte flocculent having a hematocrit of 40–60% was employed for the liquid. The relationship between gas pressure and average particle size was as indicated by region b for water (region indicated by rightward-slanted hatching), and by region c for the erythrocyte flocculent of a hematocrit of 40 to 60% (region indicated by vertical hatching) in FIG. 14.

When the pressure of the pressurized gas in region c was 3 $kg/cm^2$ or higher, the liquid was recovered in the container immediately after atomization at room temperature (without freeze-drying). However, the erythrocyte membranes were damaged, causing the internal hemoglobin to be released, i.e., there was increased hemolysis and a reduction in yield.

Thus, this approach was found to be unsuitable for treating a liquid containing vital cells. Accordingly, in the case of the aforementioned erythrocyte flocculent, atomization to yield an average particle size of 15 microns is possible within a pressurized gas pressure range of 0.8–3 kg/cm². Moreover, since the particle size can be increased by increasing the diameter of the injection opening, it was understood that atomization yielding an average particle size of 15 micron or greater was possible at a pressurized gas pressure in the range of 0.8–3 kg/cm², even when employing the aforementioned conventional two-fluid nozzle.

Figure 14:
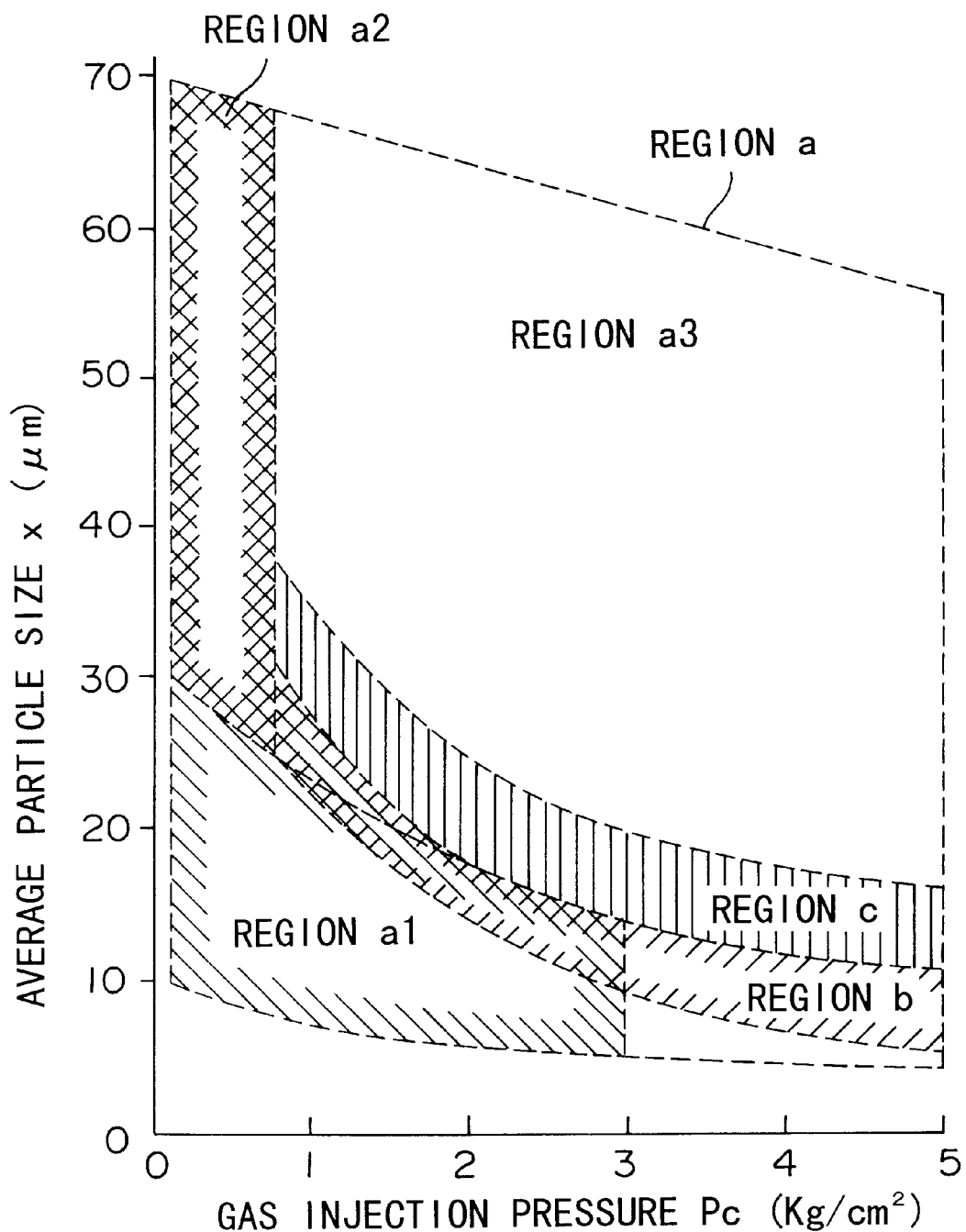
FIG. 14 is a graph showing experimental results.

In FIG. 14, region a shows the range in which the atomization of an erythrocyte flocculent having a hematocrit of 40 to 60% can be obtained using the two-fluid nozzle of the embodiments of the present invention. Region c shows the range in which the atomization of an erythrocyte flocculent having a hematocrit of 40 to 60% can be obtained using a conventional two-fluid nozzle. Comparing the two regions reveals that region a1 (the range indicated by the right-slanted hatching) and region a2 (the range indicated by the perpendicular hatching) are ranges for atomization which have been achieved for the first time by means of the two-fluid nozzle (diameter of liquid injection opening: 1.5 mm) according to the embodiments of the present invention.

As may be understood at a glance, as compared to the conventional two-fluid nozzle, the two-fluid nozzle of the present invention enables a broader range within which to realize atomization for the case where the pressure of the pressurized gas is from 0.1 to 3 kg/cm², even if the diameter of the injection opening is increased (region a1). Moreover, atomization is possible when the pressure of the pressurized gas is within the low range of 0.1 to 0.8 kg/cm², even when the diameter of the injection opening is increased (region a2). Thus, the two-fluid nozzle of the present invention enables atomization in response to a variety of vital cells of different sizes. With respect to representative sizes (diameters) of vital cells, human erythrocytes are from 7–8 microns, lymphocytes are from 11–15 microns, monocytes are from 15–20 microns, and mouse oocytes are about 50 microns. A conventional two-fluid nozzle cannot reduce the particle size below the range indicated by region b even when atomizing water. In contrast, the two-fluid nozzle of the present invention can realize atomization in the a1 region, which is below the lower limit of particle size for region b. Moreover, atomization in the a1 region is realized at a low pressure. Thus, the characteristics of the two-fluid nozzle of the present invention, namely its ability to achieve atomization in which a small particle size is achieved at low pressure, was confirmed.

Additionally, by enlarging the diameter of the injection opening, the two-fluid nozzle of the present invention is of course also able to perform atomization in the ranges realized with conventional two-fluid nozzles (region a3 (i.e., the area of region a excluding regions al and a2)). In this case, however, at the same gas pressure employed by a conventional two-fluid nozzle, the two-fluid nozzle of the present invention is able to achieve atomization having a smaller average particle size.

In the case of an erythrocyte flocculent having a hematocrit of 40 to 60% and a pressurized gas pressure of 1 kg/cm², the average particle size was 30 μm when employing a conventional two-fluid nozzle (liquid injection opening diameter: 1.2 mm) which did not have a revolving means in the vicinity of the liquid injection opening. A reduction of 20–30% in the average particle size was confirmed when the two-fluid nozzle of the present invention (liquid injection opening: 1.5 mm, spiral groove pitch: 2 mm, spiral groove depth: 0.8 mm) was employed under the same conditions, however. The depth of the spiral grooves and the height of the spiral fins are design parameters which may have a variety of values depending on the target of atomization, the properties of the liquid, and the type of components contained.

It is believed that the reason why the present invention achieves remarkable atomizing effects as compared to conventional designs is because the gas's revolving flow and the liquid's vortex flow rotate in directions that are opposite to one another. Thus, the liquid's pulverizing effect is substantial due to the more effective use of force from the liquid at the same pressurized gas pressure. Furthermore, when generating equal particle sizes, atomization at a smaller pressurized gas pressure becomes possible. This is particularly effective in the case where treating vital cells.

As described above, region a1 in FIG. 14 is the region in which atomization using a conventional two-fluid nozzle is not possible, but in which the usefulness and efficacy of the two-fluid nozzle of the present invention is seen. Conventional two-fluid nozzles also cannot perform atomization in region a2 in FIG. 14. The efficacy and usefulness of the two-fluid nozzle of the present invention may be seen in this region, in particular, in the nozzle's ability to carry out atomization at a low pressurized gas pressure. Accordingly, regions a1 and a2 are optimal when atomizing a liquid containing vital cells, in particular oocytes or easily ruptured cells which require gentle handling.

In addition, the two-fluid nozzle of the present invention is also capable of atomization in the a3 region attainable with conventional two-fluid nozzles. Thus, conditions may be set within a broad range when employing the two-fluid nozzle of the present invention to perform atomization.

Industrial Applicability

The two-fluid nozzle of the present invention can be broadly applied in the atomization of typical liquids, and may be optimally used to atomize liquids containing pressure-sensitive components or structures. Thus, the present invention can be applied to freeze-drying of a liquid containing a biological substance such as vital cells or the like.

In addition, the freeze-dryer of the present invention enables precise control of particle size during mixing and spraying of a liquid containing a biological substance. As a result, for example, freeze-dried blood obtained by this method demonstrates a low level of hemolysis, so that it may be used in transfusions.

Accordingly, the freeze-dried blood obtained by means of the present invention can be used for so-called "self-transfusions", in which an individual saves his own blood for use as needed, or can be used in the long-term storage of blood by individuals having a rare blood type, blood for regular transfusions, or the blood components thereof.

What is claimed is:

1. A freeze-dryer for a liquid containing a biological substance for freezing and drying a liquid containing a biological substance, provided with:

a biological-substance-containing liquid supply means for supplying the liquid containing the biological substance;

a two-fluid nozzle for atomizing a liquid containing a biological substance by mixing a carrier gas and a liquid containing a biological substance supplied from the biological-substance-containing liquid supply means;

a freeze-drying means for freezing the atomized liquid containing the biological substance;

a nozzle internal cleaning means for cleaning off the liquid containing the biological substance which has become affixed to the inside of the two-fluid nozzle by flushing gas or a cleaning liquid through the two-fluid nozzle;

a container for storing and preserving the frozen liquid containing the biological substance; and a drying means for sublimating the moisture inside the container;

wherein, the two-fluid nozzle is provided with a first injection hole for injecting a liquid containing a biological substance and a second injection hole for injecting a carrier gas, the second injection hole is provided about the outer periphery of the first injection hole, and a revolving means is provided to at least the front portion of first and second injection hole for rendering the gas and the liquid into respective revolving flows.

2. A freeze-dryer for a liquid containing a biological substance according to claim 1, wherein the revolving means rotates the revolving flows of the carrier gas and a liquid containing a biological substance in directions opposite to one another.

3. A freeze-dryer for a liquid containing a biological substance according to claim 1 or 2, wherein each of the revolving means are provided near the injection opening at the front end of the first injection hole.

4. A freeze-dryer for a liquid containing a biological substance according to claim 1 or 2, wherein the two-fluid nozzle is provided with:

a liquid injection opening, in the vicinity of which are provided spiral grooves or spiral fins;

a ring-shaped vortex flow chamber formed at a position so that it surrounds the liquid injection opening;

a plurality of revolving guide holes which extend in the form of a spiral to the vortex flow chamber and direct a high speed gas flow into the vortex flow chamber where a high speed revolving flow is generated; and a ring-shaped gas injection opening which injects and forms a tapered conical high speed vortex flow which has a focal point in front of the liquid injection opening of the vortex flow chamber.

5. A freeze-dryer for a liquid containing a biological substance according to claim 1 or 2, wherein a heating member is provided in the vicinity of the two-fluid nozzle.

6. A freeze-dryer for a liquid containing a biological substance according to claim 1 or 2, wherein a nozzle surface cleaning means for cleaning the surface of the two-fluid nozzle is provided.

7. A freeze-dryer for a liquid containing a biological substance according to claim 1 or 2, wherein the freeze-drying means is provided with a cooling means employing a cooling medium, and the cooling means is provided with a means for bringing the cooling medium and a liquid containing a biological substance to be freeze-dried into indirect contact.

8. A freeze-dryer for a liquid containing a biological substance according to claim 1 or 2, wherein the biological-substance-containing liquid supply means is provided with a pressure applying means for applying pressure on a liquid containing a biological substance to introduce it into the two-fluid nozzle.

9. A freeze-dryer for a liquid containing a biological substance according to claim 1 or 2, wherein the freeze-drying means has at least one of a disinfecting means for disinfecting the gas expelled from the container, a sterilizing means for sterilizing the gas expelled from the container, or a water absorbing filter means for removing liquid from the gas expelled from the container.

10. A freeze-dryer for a liquid containing a biological substance according to claim 1 or 2, wherein the container is designed to come into direct or indirect contact with the cooling medium.

11. A freeze-dryer for a liquid containing a biological substance according to claim 1 or 2, wherein a water repellent material is employed in all or a part of the inside of the container.

12. A freeze-dryer for a liquid containing a biological substance according to claim 1 or 2, wherein the drying means is provided with a heating means for heating the container.

13. A freeze-dryer for a liquid containing a biological substance according to claim 1 or 2, provided with a heating heater for heating the two-fluid nozzle; a temperature sensor for detecting the temperature of the two-fluid nozzle; and a temperature controller for controlling the two-fluid nozzle to be within a fixed temperature range.

14. A freeze-dryer for a liquid containing a biological substance according to claim 13, provided with a nozzle assembly formed by housing the two-fluid nozzle, the heating heater and the temperature sensor within the same housing.

15. A freeze-dryer for a liquid containing a biological substance according to claim 14, wherein an exhaust means for exhausting the carrier gas sprayed inside the container to the outside of the container is provided to the nozzle assembly.

16. A freeze-dryer for a liquid containing a biological substance according to claim 14, wherein a nozzle attaching and releasing means is provided for moving one or both of the nozzle assembly and the container in at least an up and down, left and right, or rotational direction, in order to insert the nozzle assembly into or remove the nozzle assembly from the container.

17. A freeze-dryer for a liquid containing a biological substance according to claim 14, wherein the drying means is designed to vacuum dry the inside of a container from which the nozzle assembly has been removed.

18. A freeze-dryer for a liquid containing a biological substance according to claim 1 or 2, wherein a container temperature controlling means is provided for controlling the temperature of the container during vacuum drying.

19. A freeze-dryer for a liquid containing a biological substance according to claim 18, wherein the container temperature controlling means is provided with at least one of a heating heater or a cooling means.

20. A freeze-dryer for a liquid containing a biological substance according to claim 18, wherein the temperature controlling means is provided with a Peltier element.

21. A two-fluid nozzle for atomizing a liquid by mixing the liquid and a gas at high speed, wherein the two-fluid nozzle is provided with:

a first injection hole for injecting the liquid, having a columnar front end, and extending straight along an axial direction of the nozzle to form a straight passage for the liquid;

a second injection hole for injecting the gas around the outer periphery of the first injection hole; and revolving means located in at least the front portion of the first and second injection holes for rending the gas and liquid into respective revolving flows, said revolving means at the first injection hole being a spiral groove or spiral fin provided to an inner wall of at least the front portion of the first injection hole, or a cylindrical member having a spiral groove or spiral fin formed in an inner wall of said member and engaging with at least the front portion of the first injection hole.

22. A two-fluid nozzle according to claim 21, wherein the revolving means rotates the revolving flows of the gas and the liquid in directions opposite to one another.

23. A two-fluid nozzle according to claim 21 or 22, wherein each of the revolving means is provided in the vicinity of the injection opening at the front end of the first injection hole.

24. A two-fluid nozzle according to claim 21 or 22, wherein the two-fluid nozzle is provided with:
- a liquid injection opening, in the vicinity of which are provided spiral grooves or spiral fins;
- a ring-shaped vortex flow chamber formed at a position so that it surrounds the liquid injection opening;
- a plurality of revolving guide holes which extend in the form of a spiral to the vortex flow chamber and direct a high speed gas flow into the vortex flow chamber where a high speed revolving flow is generated; and
- a ring-shaped gas injection opening which injects and forms a tapered conical high speed vortex flow which has a focal point in front of the liquid injection opening of the vortex flow chamber.

* * * * *